United States Patent Office 3,822,321
Patented July 2, 1974

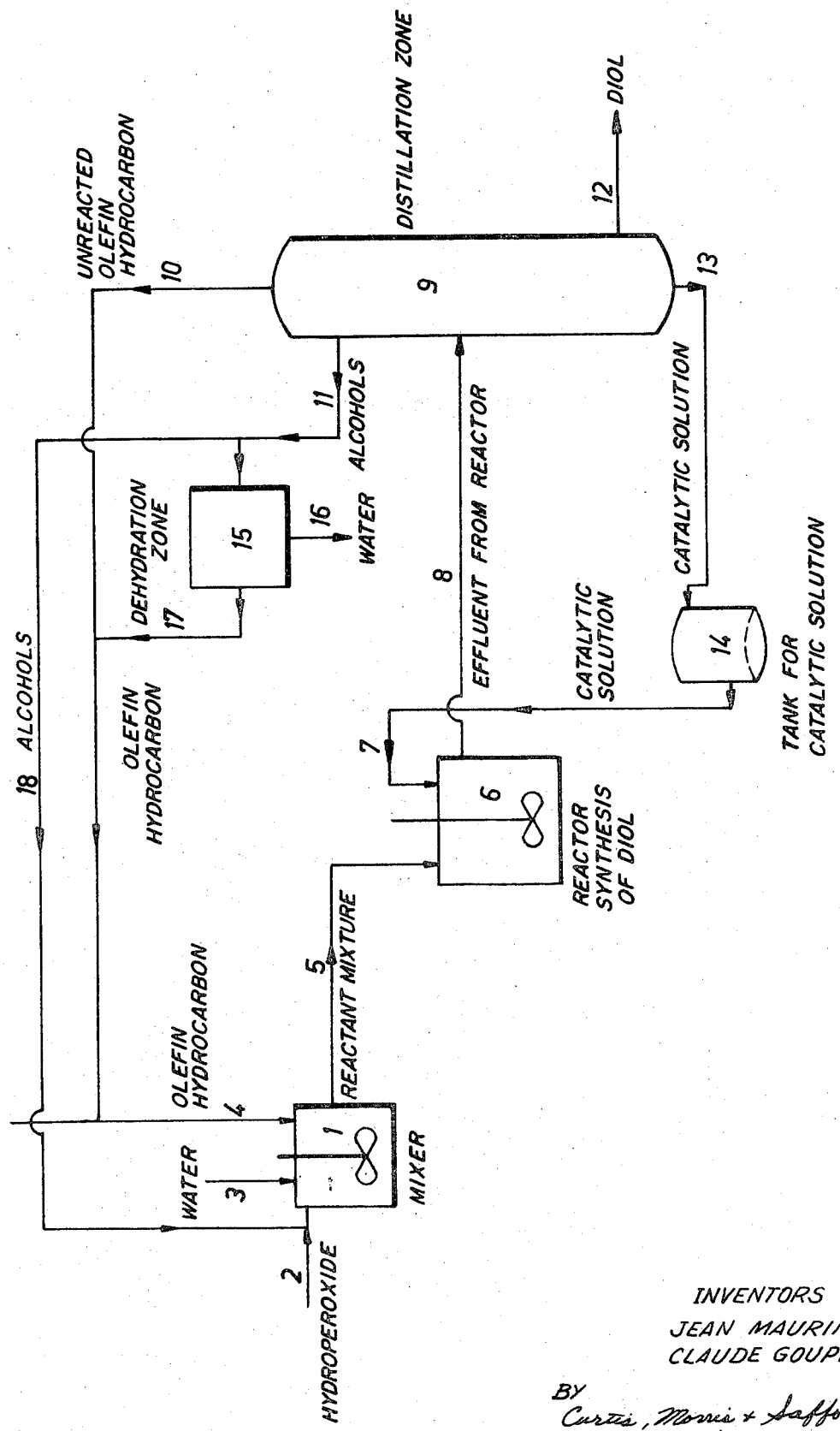

3,822,321
METHOD OF SYNTHESIZING DIOLS
Jean Maurin, Montivilliers, and Claude Goupil, Mannevillette, France, assignors to Compagnie Francaise de Raffinage, Paris, France
Filed Nov. 27, 1970, Ser. No. 92,985
Claims priority, application France, Nov. 26, 1969, 6940791
Int. Cl. C07c 1/20, 31/20
U.S. Cl. 260—635 H          5 Claims

ABSTRACT OF THE DISCLOSURE

An improved method of synthesizing vicinal diols from olefins giving higher yields by reaction with a hydroperoxide in the presence of an improved catalyst which latter can be readily recovered and reused. Also the improved catalyst which is a reaction product of a polyalcohol with a molybdenum compound such as molybdic acid or a molybdic salt.

---

The present invention relates to a method of manufacturing vicinal diols, that is to say, compounds comprising carbon and hydrogen on which two alcohol functions are attached to two adjacent carbon atoms. In the present specification, these vicinal diols will be referred to simply as "diols."

The invention relates more particularly to a new method of effecting the synthesis of such diols, which is made possible by the use of a new type of catalyst.

It is known that diols are organic products of great interest and usefulness in themselves or as intermediates for the synthesis of other products. For example, by dehydration of vicinal diols one can obtain diolefins with conjugated double bonds such as butadiene or isoprene, which are monomers in great demand particularly for the synthesis of elastomers.

Various methods of synthesizing diols have already been proposed. A first type of method consists of synthesizing an epoxide, and then hydrating said epoxide into a diol. One of the applicants has already described (in U.S. patent application Ser. No. 866,357, filed Oct. 14, 1969, now abandoned, and based on French application No. PV 169,862, filed Oct. 14, 1968) a direct method of synthesizing diols by oxidation with a hydroperoxide of the olefin corresponding to the diol desired in the presence of water and a suitable catalyst; generally a molybdenum compound, and particularly the organic salts such as naphthenate. This last-mentioned method provides diols in good yields with respect to the hydroperoxide introduced, but the recovery of the catalyst is made difficult by the fact that the catalyst either is not soluble or else is not stable in the reaction products and precipitates in a form which is difficult to remove.

The object of the present invention is to provide a method of synthesizing diols by hydroperoxidation of an olefin in the presence of a molybdenum catalyst which is soluble and stable in the reaction medium. Another object is a method in which the catalyst is completely recovered and then introduced again with the reagents for a new diol synthesis cycle.

The method of synthesizing diols in accordance with the present invention consists of contacting with each other in aqueous medium an olefin, a hydroperoxide, and a catalyst which consists of the reaction product of molybdic acid or a salt of molybdic acid with a polyalcohol. The reaction products are then separated to isolate the unreacted olefin, the alcohol resulting from the reduction of the hydroperoxide, the diol and the catalyst. The recovered catalyst is then returned to the reactor to introduce it with a further batch of olefin, hydroperoxide and water in a new diol synthesis cycle.

Diols having between 2 and 10 carbon atoms can be synthesized by the method of the invention. The invention is particularly useful for the synthesis of diols having 4 or 5 carbon atoms and especially for synthesis of butadiene diol and of methyl butane diol. These latter are diols which upon dehydration give rise to butadiene and isoprene, respectively.

The olefin used in the process is of course that which has the same carbon structure as the diolefin which it is desired to obtain. In other words, in the case of butadiene one starts with butene and in the case of isoprene one starts with methyl butene.

The hydroperoxide used may be any hydroperoxide and need not necessarily have the same carbon structure as the diol which it is desired to obtain. Nevertheless, the use of a hydroperoxide having the same carbon skeleton as the diol to be prepared results in obtaining, parallel with the diol, an alcohol which latter has the same carbon structure; so that by dehydration of this alcohol one obtains an olefin which is the same as that originally introduced. One thus avoids accumulating in the reactor an alcohol having a carbon skeleton different from that of the diol. Furthermore, it is not necessary to feed the reactor with a fresh batch of olefin since the amount of olefin necessary for the reaction is regenerated from the alcohol.

As has been seen, the catalyst consists of a reaction product of a polyalcohol with a molybdenum compound such as molybdic acid or a molybdic salt.

Although any polyalcohol may be used, generally a diol is selected, and preferably the diol which is desired from the synthesis of the present invention. In fact, this makes it possible to recover all the catalyst upon the separation of the reaction products. For example, in a synthesis of isoprene, where one starts from isopentane, oxidizes it to isopentane hydroperoxide, and the latter is used in the synthesis of the diol by action in the presence of water on isoamylene; there will preferably be used as catalyst the reaction product of a molybdenum compound, for instance, ammonium molybdate, on 2-methyl-2,3-butane-diol.

Other characteristics of the invention will become evident from the following detailed description of its application to the preparation of methyl butane diol from methyl butene.

In the specification and in the accompanying drawing there are described and shown illustrative embodiments of the invention and various modifications thereof are suggested, but it is to be understood that these are not intended to be exhaustive, but on the contrary, are given for purposes of illustration in order that others skilled in the art may more fully understand the invention so that they may modify and adapt it in various forms, each as may be best suited to the conditions of a particular use.

The various objects, aspects, and advantages of the present invention will be more fully understood from a consideration of the following specification in conjunction with the accompanying drawing which is a diagram of the installation employed.

Tertiary amylhydroperoxide is introduced into a first reactor 1 through the line 2, water is introduced through the line 3 and methyl butene through the line 4. These products are mixed and withdrawn thruogh the line 5. The mixture is then introduced into a single reactor 6 into which the catalyst for the reaction is fed through the line 7. The reaction takes place at a temperature between 60 and 180° C. and preferably between 100 and 140° C. The time of this reaction may be between 20 minutes and a few hours. The reaction products are withdrawn via the line 8 and introduced into a distillation column 9 where they are separated. The excess unreacted methyl butene is withdrawn through the line 10 at the top. The methyl butanol which has formed during the reaction is withdrawn through the line 11. The methyl butane diol is withdrawn through the line 12. The catalyst is withdrawn through the line 13 and sent to storage 14. From there it will be used again being sent through the line 7 into the reactor 6 with a new batch fed through the line 5. The methyl butanol and the water in excess are withdrawn through the line 11 and sent into the reaction zone 15 where the alcohol undergoes a dehydration in the presence of a catalyst having, for instance, a base of alumina. From the reaction zone 15 the water is withdrawn through the line 16 and methyl butene, regenerated from the methyl butanol, is withdrawn through the line 17. The methyl butene in line 10 and in line 17 are then mixed together and returned via the line 4 into the reactor 1 with a new batch of tertiary amyl hydroperoxide and water.

It is possible to use an inert solvent, for instance an alcohol, for the synthesis reaction of the diol. This alcohol might accompany the hydroperoxide or might facilitate the dissolving of the catalyst. Such an alcohol is preferably one which results from the reduction of the hydroperoxide. In this latter case this alcohol after distillation would emerge through the line 11 and be recycled through the line 18.

The invention is furthermore illustrated by the following examples:

EXAMPLE I

This example is intended to illustrate one method of preparing the catalyst of the invention.

12.8 cc. of concentrated $HNO_3$ are added to a solution of 18.4 g. of ammonium molybdate in 500 cc. of water. A precipitate is obtained which is then dried by mechanical action. This precipitate contains 38.7% molybdenum. 7.16 g. of this precipitate (namely 2.77 g. of molybdenum) are charged with 50 cc. of 2-methyl-2,3-butanediol into a reactor which is brought to 85° C. The reaction proceeds for one hour at a pressure of 100 mm. mercury. The reactor is then brought to 95° C. under a pressure of 30 mm. mercury. In this way water and a small amount of diol are distilled off so that the final weight of the solution is 46.6 g. This solution contains 5.94% molybdenum. A progressive dissolving of the precipitate is observed throughout the manufacture of this catalyst. At the end of the operation one obtains a clear yellow solution which has a tendency to crystallize out when cooled, but a slight heating is sufficient to make it clear again.

EXAMPLE II TO VI

Examples III to VI are intended to illustrate the method of the invention by way of comparison with Example II which was carried out with a known catalyst, molybdenum naphthenate. In each of these examples 0.09 mol of tertiary butyl hydroperoxide was reacted with 2-methyl-2-butene in a sealed tube placed in a metal jacket and heated with agitation. The catalyst used in Examples III to V is the one whose preparation was described in Example I above. In Example VI, the residue obtained upon distillation of the products of the reaction of Example V was used as catalyst. This residue is of a dark yellow color, but it is entirely clear.

The operating conditions and results of these examples are given in Table I below. The table shows that the use of the catalyst of the invention at a temperature of 120° C. when operating for one hour gives a practically complete transformation of the hydroperoxide, even when the amount of catalyst used is as little as $2.25 \times 10^{-4}$ atoms of molybdenum per molecule of hydroperoxide. It is also noted that with the catalyst of the invention no epoxide is formed, while in Example II employing molybdenum naphthenate 4.2% epoxide is formed together with 91.3% diol. The other products obtained in Example II and in Examples III to VI are by-products, for instance, methyl isopropyl ketone.

It should be noted that in the case of Example II, the reaction products are cloudy and, at rest, a precipitate deposits; while on the other hand, the products of Examples III, IV and V are clear and practically colorless. Similarly in the case of Example VI clear reaction products are obtained. Moreover in Example VI it is seen that the yield of diol is greater than that of all the other examples. This shows that one can advantageously recycle the catalyst recovered by distillation from the products of the reaction.

These examples show that the catalyst of the invention makes it possible to effect the synthesis of diol in completely homogeneous phase. As a matter of fact, there is no deposit, no cloud, no precipitate and furthermore the recovery of the catalyst after its use in the diol synthesis cycle is very simple and advantageous.

TABLE I

| Example number | 2 [1] | 3 | 4 | 5 | 6 |
|---|---|---|---|---|---|
| Operating conditions: | | | | | |
| Temperature, °C | 100 | 120 | 120 | 120 | 120 |
| Time, hr | 1 | 1 | 1 | 1 | 1 |
| Molar ratios used: | | | | | |
| Olefins/hydroperoxide | 4 | 4 | 4 | 4 | 4 |
| $H_2O$/hydroperoxide | 3 | 3 | 3 | 3 | 3 |
| Mo/hydroperoxide | $4 \times 10^{-3}$ | $4 \times 10^{-3}$ | $10^{-3}$ | $2.25 \times 10^{-4}$ | $4 \times 10^{-3}$ |
| Nature of the catalyst | (2) | (3) | (3) | (3) | (4) |
| Results: | | | | | |
| Conversion of the hydroperoxide | 93.9 | 99.9 | 98.9 | 99.7 | 99.9 |
| Molar yields in: | | | | | |
| Epoxide | 4.2 | | | | |
| Diol | 91.3 | 90.8 | 91.8 | 83.1 | 96.9 |

[1] Given by way of comparison.
[2] Mo-napht.
[3] Mo-diol.
[4] Recycled Mo-diol.

EXAMPLES VII TO IX

In these examples the same reagents are used as in Examples III to V. On the other hand the temperature is different. Table II below indicates these temperatures and also gives the results of these Examples VII to IX.

These examples show that excellent conversions and very good selectivities can be obtained at 100° C. On the other hand, the conversion starts to decrease when the temperature becomes as low as 90° C.

EXAMPLE X

This example is intended to illustrate another preparation of a catalyst in accordance with the invention from ammonium molybdate. Commercial ammonium molybdate of the formula $(NH_4)_6Mo_7O_{24} \cdot 4H_2O$ is dissolved in water so as to obtain a solution having a concentration of 26% by weight of said product. 18.27 g. of said solution are mixed, with agitation, with 50.48 g. of 2,3-butanediol. A finely dispersed precipitate is formed. The mixture is then heated under an initial pressure of 100 mm. of mercury and thereafter adjusted to 15 mm. of mercury so as to distill the water. It is then observed that all the ammonia contributed by the salt in the form of ammonium is liberated and that the salt dissolves in the diol to give a clear solution of a brownish yellow color. A small amount of diol also distills off during this operation so that the final concentration of the solution is 5.44% molybdenum.

EXAMPLE XI

In this example the same tests are carried out as in Examples III to VI, but this time one operates at a temperature of 100° C. and $4 \times 10^{-3}$ mol, counted as molybdenum of the catalyst prepared in accordance with the method described in Example X, are used. Under these conditions, the conversion of the hydroperoxide is 93.2% and the molar yield of diol is 98.6%. From this example it is seen that the catalyst is both very active (high rate of conversion) and very selective (very high yield of diol). It is furthermore noted that the catalyst remains perfectly soluble in the reaction medium at the end of the test. No deposit or cloud occurs. It can therefore be easily separated by distillation of the reaction products and recycled.

TABLE II

| Example number | 7 | 8 | 9 |
|---|---|---|---|
| Operating conditions: | | | |
| Temperature, °C | 100 | 90 | 100 |
| Time, hr | 1 | 1 | 1 |
| Molar ratios used: | | | |
| Olefin/hydroperoxide | 4 | 4 | 4 |
| H₂O/hydroperoxide | 3 | 3 | 3 |
| Mo/hydroperoxide | 4×10⁻³ | 4×10⁻³ | 10⁻³ |
| Nature of the catalyst | (¹) | (¹) | (¹) |
| Results: | | | |
| Conversion of the hydroperoxide | 98.9 | 85.9 | 97.8 |
| Molar yields in: | | | |
| Epoxide | | | |
| Diol | 93.3 | 89.6 | 94.8 |

¹ Example I.

We claim:

1. A method of synthesizing vicinal diols having 4 or 5 carbon atoms per molecule comprising the steps of: contacting, in a reaction zone, at a temperature between 60° C. and 180° C., in an aqueous medium, an olefin hydrocarbon of the group consisting of butenes or methylbutenes, an alkane hydroperoxide which forms an alcohol as reduction product, and a catalyst which consists essentially of the reaction product of molybdic acid or ammonium molybdate with a vicinal alkanediol having 4 or 5 carbon atoms per molecule; separating the products of the reaction to isolate the unreacted olefin hydrocarbon, the alcohol resulting from the reduction of the hydroperoxide, the vicinal alkanediol and the catalyst and recycling the catalyst to said reaction zone.

2. A method as recited in Claim 1 wherein the hydroperoxide has a carbon structure identical to that of the vicinal diol produced.

3. A method as recited in Claim 2, wherein the alcohol resulting from said hydroperoxide is dehydrated to yield said olefin hydrocarbon which latter is recycled to said reaction zone.

4. A method as recited in Claim 1, wherein the vicinal diol used in the preparation of the catalyst is identical to the vicinal diol produced.

5. A method of synthesizing 2-methyl-2,3-butane diol comprising the steps of contacting in a reaction zone, at a temperature between 60° C. and 180° C., in an aqueous medium, 2-methylbutene-2, tertiary amyl hydroperoxide and a catalyst which consists essentially of the reaction product of molybdic acid or ammonium molybdate with a vicinal alkanediol having 4 or 5 carbon atoms, thereupon separating the products of the reaction to isolate, in addition to small amounts of by-products, unreacted 2-methylbutene-2, methyl butanol and water, 2-methyl-2,3-butanediol and the catalyst, recycling the catalyst thus recovered to said reaction zone, dehydrating the 2-methyl butanol into 2-methylbutene-2 and recycling the unreacted 2-methylbutene-2 with the 2-methylbutene-2 from the dehydration of the methyl-butanol into the said reaction zone.

References Cited

UNITED STATES PATENTS

| | | | |
|---|---|---|---|
| 3,391,214 | 7/1968 | Fetterly | 260—632 C |
| 3,666,777 | 5/1972 | Sorgent | 252—430 |
| 2,776,301 | 1/1957 | Payne et al. | 260—635 H |
| 3,475,499 | 10/1969 | Winnick | 260—635 E |
| 3,629,144 | 12/1971 | Hahn et al. | 260—635 H |
| 3,480,563 | 11/1969 | Bonetti et al. | 252—431 R |
| 3,360,584 | 12/1967 | Kollar | 260—632 C |
| 3,434,975 | 3/1969 | Sheng et al. | 252—431 R |
| 3,507,809 | 4/1970 | Kollar | 252—430 |
| 3,665,047 | 5/1972 | Gislon et al. | 260—635 H |

FOREIGN PATENTS

| | | | |
|---|---|---|---|
| 950,669 | 2/1964 | Great Britain | 260—635 H |

JOSEPH E. EVANS, Primary Examiner

U.S. Cl. X.R.

252—431 R; 260—610 R, 632 R, 681, 682